April 2, 1946.  R. D. McCOY  2,397,557
LIMIT STOP
Filed Dec. 26, 1942
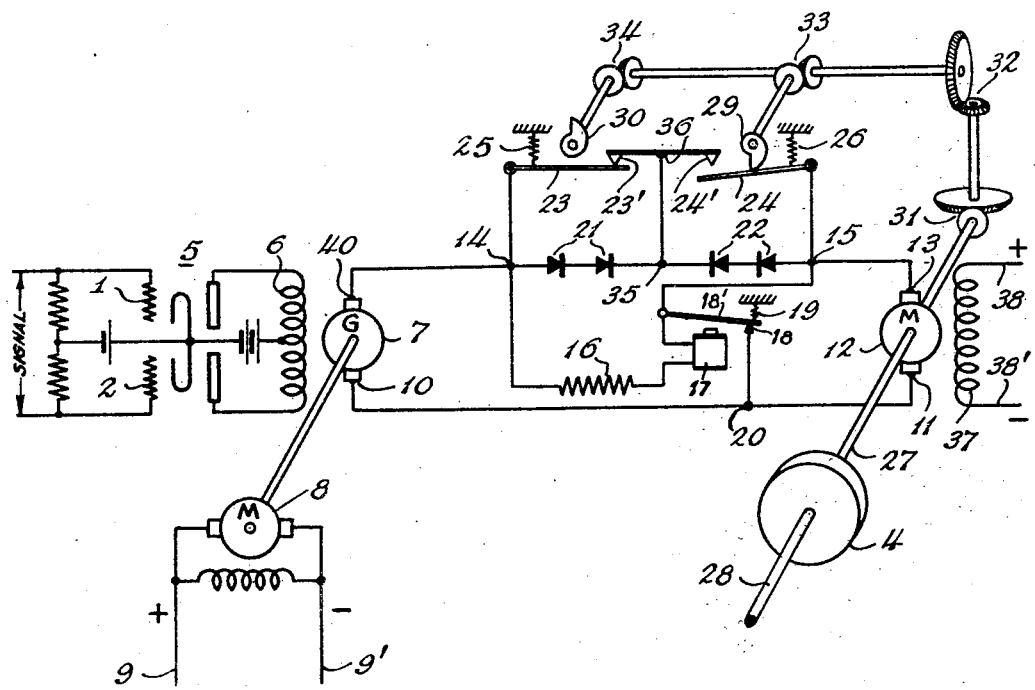
INVENTOR
R. D. McCOY
BY
Herbert H. Thompson
his ATTORNEY Patented Apr. 2, 1946

2,397,557

UNITED STATES PATENT OFFICE 2,397,557

LIMIT STOP

Rawley D. McCoy, Bronxville, N. Y., assignor to Sperry Gyroscope Company, Inc., Brooklyn, N. Y., a corporation of New York Application December 26, 1942, Serial No. 470,294

13 Claims. (Cl. 172—239)

The present invention has reference to a novel system of limit stops especially adapted for use with an electrical remote control system.

The object of a remote control system is ordinarily to drive a ponderable object into some desired position, which may be a position of coincidence with a low-power operated object, such as a handwheel. A control signal voltage may be generated, indicative of the amount and direction of the displacement of the controlled object from its desired position. This control voltage may then be employed to control the direction and speed of a suitable driving means, such as a motor, which drives the controlled object in such a direction as to reduce the control signal voltage to zero, at which time the object will be at its desired position. Some kind of a follow-up system is also driven synchronously with the controlled object in order to provide a means of measuring the displacement of the object from its desired position, and driving control signal voltages proportional thereto.

In most cases there are certain limiting positions of travel which it is imperative that the controlled object not exceed, irrespective of the value or direction of the control signal voltage. These limitations may be imposed, for example, by restrictions in the mounting equipment of the controlled object, which render mechanically impossible any motion beyond a certain point. In such a situation, when the controlled object approaches its limiting position, it is desirable to render ineffective the control of the signal voltage, and at the same time to strongly brake the motor so that the object will come to rest before damage is done. When the object is thus at rest in its limiting position, the motor should be under the control of the signal voltage only for voltage signals tending to produce rotation in the direction away from the limit.

Accordingly, it is the primary object of the present invention to provide an exceedingly simple and reliable system of limit stops adapted to apply dynamic braking to the driving motor of an electrical remote control system at a predetermined limiting position in the travel of the controlled object, and simultaneously to render ineffective signal voltages normally causing rotation of the motor in such a direction that the object would exceed the limiting position, while allowing signal voltages of the opposite sense to retain their full control.

Another object of the invention is to provide a system of limit stops particularly useful with a Ward-Leonard type of remote control system.

Other objects and advantages will become apparent from the specification, taken in connection with the accompanying drawing wherein the invention is embodied in concrete form.

I attain these objects by mechanism illustrated in the accompanying drawing, in which, The single figure is a combination wiring diagram and perspective drawing illustrating a preferred embodiment of the present invention.

Referring now to the figure, wherein the system of limit stops of the present invention is shown for the sake of concreteness as employed in a Ward-Leonard type of remote control system, a control signal voltage is shown applied to the grids 1 and 2 of the conventional push-pull D. C. amplifier circuit 5. This control signal voltage corresponds in polarity and magnitude to the sense and magnitude of the displacement of the controlled object 4 from its desired position. This control voltage, having been amplified in amplifier 5, is then applied across the field winding 6 of the D. C. generator 7.

The generator 7 is shown as driven from a shunt-wound direct current motor 8, which is energized from a constant source of direct current as by leads 9, 9'. One output terminal 10 of the generator 7 is directly connected to one terminal 11 of the direct current driving motor 12, whereas the other output terminal 40 of the generator 7 is connected to terminal 13 of the motor 12 through three parallel circuits which appear between the points 14 and 15.

The lower circuit connecting the points 14 and 15 comprises a resistor 16 and a relay coil 17. Energization of the relay coil 17 is adapted to close the normally open contacts 18, 18' against the operation of the spring 19, thereby causing a short circuit across the points 15 and 20, and consequently across the armature of the driving motor 12.

Also connected in series across the points 14 and 15 are two sets of rectifiers 21, 22. These rectifiers, which may, for example, be of the well-known selenium oxide or copper oxide type, form a very high resistance to current flow through them in one direction, the back direction, while constituting a very low resistance, approaching a short circuit, to current flow in the opposite, or forward, direction. The forward direction of the rectifiers 21, 22 is indicated by the direction of the arrows. As shown, the rectifiers are connected in the circuit so that their forward directions oppose, the forward direction of each being toward the mid-point 35.

A series circuit is also made across the points 14 and 15 through the two pairs of normally closed contacts 23, 23' and 24, 24'. As shown, these two pairs of contacts are normally maintained in their closed position through the action of the springs 25 and 26, respectively but may be opened by the cams 30 and 29, respectively. Mid-point 36 between the two pairs of contacts 23, 23' and 24, 24' is electrically connected to mid-point 35 between the two sets of rectifiers 21 and 22.

The direct current driving motor 12, the field winding 37 of which is energized from a constant source of direct current, as by leads 38, 38', positions the controlled object 4 as by way of shaft 27. Shaft 28, also actuated from the driving motor 12, is provided in order to drive some sort of follow-up mechanism (not shown), from which the control signal voltage may be obtained.

Driving motor 12 is also shown as actuating two cams 29 and 30 through bevel gears 31, 32, 33 and 34. The cams 29 and 30 and their associated gearing are so designed that the contacts 24, 24' are caused to open at the limiting position of the controlled object 4 in one direction, while the contacts 23, 23' are caused to open at the limiting position of the controlled object in the opposite direction.

In operation, therefore, the contacts 23, 23' and 24, 24' will be closed at all positions of the controlled object 4 intermediate to the limiting positions. In such case, since a short-circuit will be effected across the points 14, 15, the relay 17 will not be energized, and the contacts 18, 18' will be open. Therefore, the voltage generated at the terminals 10 and 40 of the generator 7 will be applied directly to the armature terminals 11 and 13 of the motor 12, and the system will operate in the normal manner as a Ward-Leonard type of remote control system.

Thus, in normal operation the signal voltage, indicative of the amount and direction of the displacement of the controlled object 4 from its desired position, is linearly amplified in the push-pull amplifier circuit 5 and applied to the field winding 6 of the direct current generator 7. The generator 7, being driven at a substantially constant speed from motor 8 will produce a proportionate, but further amplied, voltage across its output terminals 10 and 40. This generated voltage is then applied to the armature of the driving motor 12, the field of which is energized from a constant source of direct current. The driving motor 12 will therefore drive the controlled object 4 and its associated follow-up mechanism, at a speed and in a direction corresponding to the magnitude and polarity of the voltage applied to the motor terminals 11 and 13, and consequently also corresponding to the magnitude and polarity of the original control signal voltage. The motor 12 will continue to drive the object in response to the control signal voltage until the desired position is reached, at which time the control voltage will have been reduced to zero.

It will now be assumed that the motor 12 has driven the controlled object 4 to the particular limiting position at which the cam 29 will cause the contacts 24, 24' to open, and that the control signal voltage is still of such a polarity as would normally cause the controlled object to continue to be driven on past this limiting position. These are the conditions illustrated in Fig. 1. It will be understood that the polarity of the control voltage required to produce rotation of the motor in such a direction is such as would cause current flow from the point 14 to the point 15. Accordingly, since contacts 24, 24' are now open, current must flow through the rectifiers 22 in a direction opposite to its forward direction, thereby producing a high voltage drop across the points 14 and 15.

In this way a high voltage will build up across the points 14 and 15 and will partially be applied to the relay coil 17. The resulting energization of relay coil 17 is sufficient to cause the contacts 18, 18' to close, short-circuiting the armature terminals 11 and 13 of the motor 12 and causing dynamic braking of the motor. At the same time the control voltage generated across the output terminals 10 and 40 of the generator 7, being still of the same polarity, encounters only a high resistance current path either through the resistance 16 and relay coil 17 or alternatively through the rectifiers 22 in a direction opposite to its forward direction. Thus, with contacts 24, 24' open, a control signal voltage which would produce displacement of the controlled object 4 in such a direction as to exceed the limiting position of the object will maintain the contacts 18, 18' closed, thus rendering ineffective the control signal voltage.

On the other hand, a control signal voltage of such a polarity as would normally back the controlled object off away from its limiting position will find a short-circuit path between the points 14 and 15, since the current produced will travel in the forward direction of rectifiers 22. Since the relay coil 17 will no longer be energized, the spring 19 will open the contacts 18, 18', removing the short-circuit from the motor 12, and allowing it to drive the controlled object 4 away from the limit. As this occurs the cam 29 will be rotated in such a direction as to allow the spring 26 to close the contacts 24, 24' thus restoring the whole system to its normal operating condition with contacts 24, 24' and 23, 23' closed and contacts 18, 18' open.

Should a limiting position be reached in the opposite direction to that just described, it is obvious that cam 30 will cooperate with contacts 23, 23', rectifiers 21, relay coil 17, and contacts 18, 18' to produce a similar polarity responsive control over the motor 12.

It will be understood that the cams 29 and 30 need not be actuated only in response to the position of the controlled object 4, but may also be controlled from the rate of said controlled object and from any other physical conditions which it is desired to set in.

The circuit arrangement disclosed, consisting of the three parallel branches between the points 14 and 15, need not necessarily be connected between the motor 7 and generator 12, but could equally well be inserted in series with the original control signal voltage, or at any subsequent stage in its amplification. It is considered advantageous, however, to locate the circuit arrangement as shown in order to insure operation of the limit stop in case a continuous voltage should ever be applied to the motor 12, irrespective of the value of the control signal voltage. This condition might occur, for example, upon failure of any of the intermediate amplifier stages.

Although the present invention has been illustrated for concreteness in a Ward-Leonard type of remote control system, it could equally well be applied to any electrical remote control system wherein a motor drives a controlled object in a direction corresponding to the sense of a control signal voltage.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A limit stop for a remote control system wherein a motor normally drives an object to a desired position in response to a signal voltage comprising a relay arranged in the circuit so that actuation of the relay coil is adapted to short-circuit the armature of said motor, a uni-directional circuit element in series with said armature and in parallel with said relay coil, and means responsive to the position of said object for short-circuiting said element.

2. A limit stop for a remote control system wherein a motor normally drives an object to a desired position in response to a signal voltage, comprising a relay, means for short-circuiting the armature of said motor upon actuation of said relay, a rectifier in series with said armature and in parallel with said relay coil, and means for short-circuiting said rectifier except when a predetermined set of conditions, including the position of said object, has been obtained.

3. A limit stop for a remote control system wherein a motor normally drives an object to a desired position in response to a signal voltage, comprising a relay arranged in the circuit so that actuation of the relay coil is adapted to short-circuit the armature of said motor, a rectifier in series with said armature and in parallel with said relay coil, switching means for short-circuiting said rectifier, and a cam responsive to the position of said object for actuating said switching means.

4. A limit stop for a remote control system wherein a motor normally drives an object to a desired position in response to a signal voltage, comprising means responsive to the sense of said signal voltage for short-circuiting the armature of said motor, switching means for rendering ineffective said former means, and cam means responsive to the position of said object for actuating said switching means.

5. A limit stop for a remote control system wherein a motor normally drives an object to a desired position in response to a signal voltage, comprising a circuit arrangement in series with the armature of said motor, said arrangement consisting of a first switch, a unidirectional circuit element, and a relay coil, all connected in parallel, cam means responsive to the position of said object for actuating said first switch, and a second circuit arrangement connected across the armature of said motor, said second circuit consisting of a second switch responsive to the energization of said relay coil.

6. A limit stop for a remote control system wherein a motor normally drives an object to a desired position in response to a signal voltage, comprising a circuit arrangement in series with the armature of said motor, said arrangement consisting of a first switch, a rectifier, and a relay coil, all connected in parallel, cam means responsive to the position of said object for actuating said first switch, and a second circuit arrangement connected across the armature of said motor, said second circuit consisting of a second switch responsive to the energization of said relay coil.

7. A limit stop for a remote control system wherein a motor normally drives an object to a desired position in response to a signal voltage, comprising means responsive to the sense of said signal voltage for short-circuiting the armature of said motor, and means responsive to the position of said object for rendering ineffective said former means.

8. A limit stop for a remote control system wherein a motor normally drives an object to a desired position in response to a signal voltage, comprising a relay arranged in the circuit so that actuation of the relay coil is adapted to short-circuit the armature of said motor, control means responsive to the sense of the signal voltage for actuating said relay, and means responsive to the position of said object for rendering ineffective said control means.

9. A system of limit stops for a remote control system wherein a motor normally drives an object to a desired position in response to a signal voltage, comprising two normally short-circuited unidirectional circuit elements connected, with their forward directions opposing, in series with the armature of said motor, means responsive to the position of said object for selectively removing the short-circuited condition of one or the other of said elements, and means responsive to the potential across both of said elements for short-circuiting the armature of said motor.

10. A limit stop arrangement for a remote controlled object comprising a motor for moving the object back and forth between two limit stops, a control circuit for the motor effective to control the direction of the motor according to the direction of the current in the circuit, a pair of rectifiers oppositely connected in the circuit, normally closed contact means individual to the rectifiers forming a shunt about each rectifier, means controlled by the object on reaching either limit stop to operate an appropriate one of the contact means thereby opening the shunt about the associated rectifier, the rectifier being so poled as to cut off current of such direction as to tend to operate the motor to drive the object beyond the limit stop.

11. A limit stop arrangement for a remote controlled object comprising a motor for moving the object back and forth between two limits, a control circuit for the motor effective to control the direction of the motor according to the direction of the current in the circuit, a pair of rectifiers oppositely connected in the circuit, a shunt for each rectifier comprising a pair of normally closed contacts, means for opening one or the other pairs of contacts as the object reaches either of the respective limits thereby removing the shunt from the associated rectifier, said rectifier being so poled as to cut off the current in the control circuit operating the motor.

12. A limit stop arrangement according to claim 11, in which opposite poles of the rectifiers are connected together and in which both rectifiers are shunted by a circuit including a relay, the relay being operable on the opening of either pair of contacts, the relay when operated being adapted to brake the motor.

13. A limit stop arrangement according to claim 11, wherein the control circuit is such that when one pair of contact means is open, only current in reverse direction therein will operate the motor, whereby subsequent motion of the object must be toward the more remote limit.

RAWLEY D. McCOY.